March 6, 1962  P. M. MOSER  3,024,410
CONTINUOUS READING FREE NUCLEAR PRECESSION
MAGNETOMETER AND METHOD
Filed June 25, 1957  2 Sheets-Sheet 1

INVENTOR.
PAUL M. MOSER
BY
ATTORNEYS

March 6, 1962  P. M. MOSER  3,024,410
CONTINUOUS READING FREE NUCLEAR PRECESSION
MAGNETOMETER AND METHOD
Filed June 25, 1957  2 Sheets-Sheet 2
Fig. 2
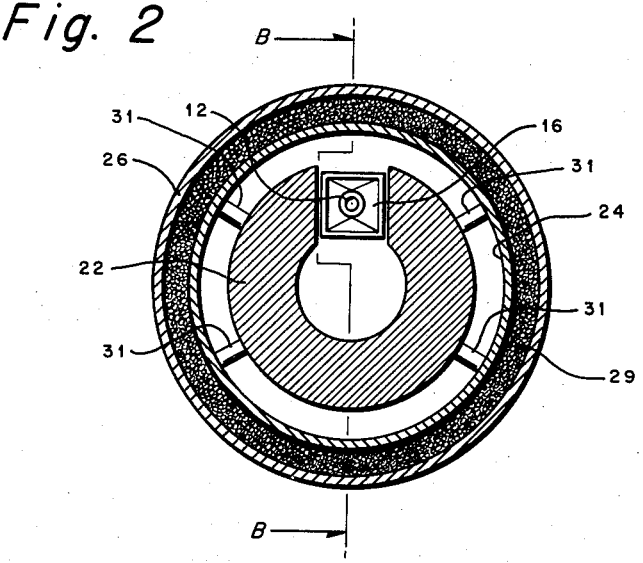
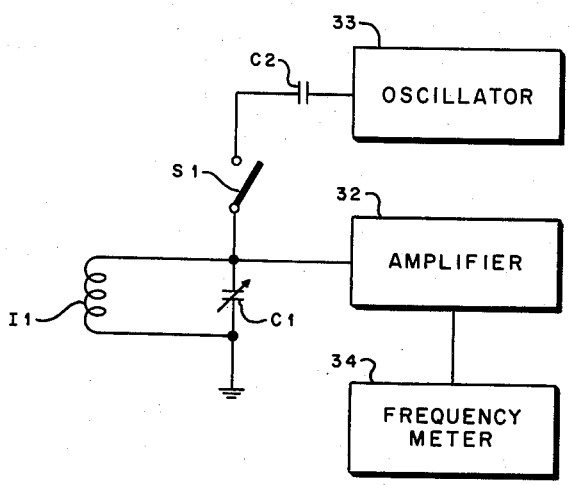
Fig. 3
INVENTOR.
PAUL M. MOSER
BY
ATTORNEYS United States Patent Office 3,024,410
Patented Mar. 6, 1962

3,024,410
CONTINUOUS READING FREE NUCLEAR PRE-
CESSION MAGNETOMETER AND METHOD
Paul M. Moser, Elkins Park, Pa., assignor to the United
States of America as represented by the Secretary of
the Navy
Filed June 25, 1957, Ser. No. 668,004
12 Claims. (Cl. 324—.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for measuring the intensities of magnetic fields and more particularly to a method and apparatus utilizing principles of nuclear precession for measuring in a continuous manner the intensities of magnetic fields, especially weak magnetic fields.

Present methods and apparatus relying on free nuclear precession for measuring the intensity of a magnetic field or otherwise correlating the magnetic properties of the atomic nuclei portions of atoms with applied magnetic fields initially subject a sample of substance possessing nuclear magnetic moments to a polarizing magnetic field at some angle to the direction of the magnetic field to be measured. The polarizing field is then suddenly removed and the nuclei thereby begin to precess about the vector of the magnetic field to be measured, hereafter referred to as the precession field. In returning to their equilibrium state, the nuclei, acting as individual magnets with their own magnetic fields, induce an alternating voltage in a coil which is placed conveniently for this purpose. The frequency of this voltage is that of the precession frequency of the nuclei which is directly related to the magnetic field intensity. A full discussion of the principles involved and an example of typical apparatus for carrying out the procedure just described, appears in Reissue Patent 23,769, dated January 12, 1954, for "Method and Means for Correlating Nuclear Properties of Atoms and Magnetic Fields," issued in the name of R. H. Varian.

A technique of the variety just described has several practical disadvantages. For one, the polarizing field is applied in pulses, with the time between successive pulses devoted to the measurement of the output signal which consists of a series of time-decaying pulses. Since the signal cannot be observed while the polarizing field is being pulsed, and since over half the time of making a determination is involved in pulsing action and waiting for unwanted transients to decay, the time interval in which frequency measurements may be made is quite small, and the accuracy of precession frequency measurement, dependent on the duration of observation, is severely limited. Furthermore, because the decay time of spurious transients must be kept to a minimum, the intensity of the polarizing field must be kept down to about 100 oersteds, which limits the degree of polarization obtained. Also, pulsing of a magnetic field can be obtained only with an electromagnet requiring a heavy duty electrical power source and switching devices, thereby limiting the portability of apparatus of this type. Another disadvantage of the pulsed system is that it may fail to detect meaningful fluctuations of short duration in a varying magnetic field due to the fact that actual measurements are being taken during only a fraction of the monitoring time. Present continuously recording magnetometers based upon principles other than free nuclear precession, e.g., saturable reactor type, require that the sensing head be maintained with great accuracy at some fixed orientation with the direction of the magnetic field undergoing measurement. This usually means, especially in cases of moving magnetometer carriers, that elaborate and expensive apparatus for maintaining the orientation must be provided, which places additional limitations on the accuracy which is obtainable. Hence, there is need for an accurate continuously recording magnetometer which will function under conditions of variable orientation with respect to the field undergoing measurements.

The present invention overcomes the disadvantages of the prior free nuclear precession methods and apparatus described above as well as other types by eliminating the pulsed polarizing field and its attendant drawbacks including the need for a heavy duty electric power source. The invention in a preferred embodiment passes a fluid sample containing atomic nuclei of large gyromagnetic ratio successively through a strong polarizing magnetic field such as one caused by a permanent magnet and a coil appropriately located for detecting the voltage at the precession frequency. The voltage induced in the coil is amplified and its frequency measured by standard methods. The fluid sample may be circulated continuously within a closed system.

An object of the present invention is the provision of a method and apparatus for measuring the intensity of a magnetic field by the use of continuous free nuclear precession frequency measurements.

Another object is to provide a method and apparatus for correlating in a continuous manner the magnetic properties of atomic nuclei with applied magnetic fields.

A further object of the invention is a method and apparatus for continuously measuring the intensity of the earth's magnetic field based on free nuclear precession and not requiring constant orientation with the direction of the field undergoing measurement.

Still another object is to provide a technique and apparatus relying on principles of free nuclear precession for measuring the intensity of a magnetic field relying on simple, reliable equipment capable of accuracy heretofore unobtainable.

The exact nature of this invention, as well as other objects thereof, will be readily apparent from consideration of the following specification relating to the annexed drawings in which:

FIG. 2 is a view along A—A of FIG. 1.

FIG. 3 shows the apparatus of FIG. 1 incorporated into a typical system for initiating its operation and recording its results.

Figure 1:
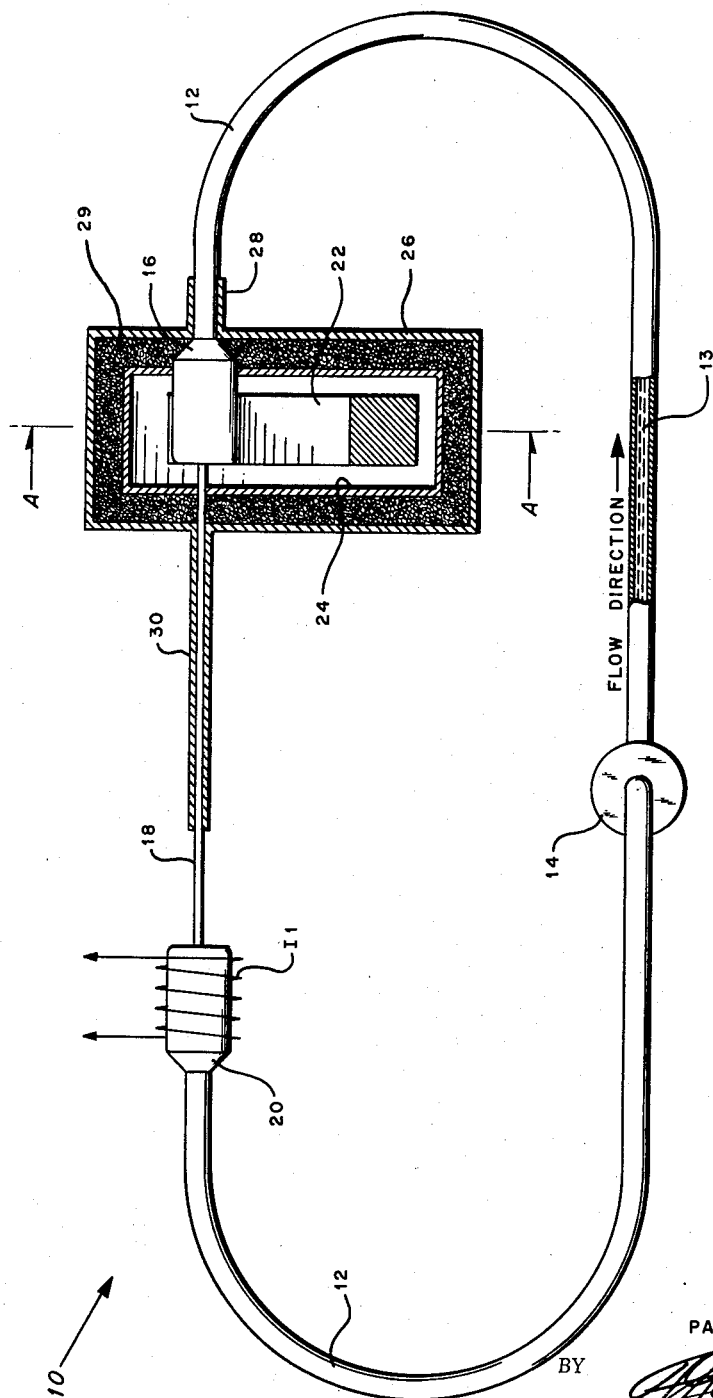
FIG. 1 illustrates schematically by a view along B—B of FIG. 2 one embodiment of this invention.

There is shown in FIGS. 1 and 2 a magnetometer 10 comprising in this instance a closed cycle fluid flow system constructed of tubing 12 made from non-magnetic material such as glass for circulating therein in the direction of the arrow a liquid 13 of the type hereinafter described by a pump 14.

Any liquid or fluid can be used in tubing 12 for the purpose of this invention provided the fluid selected contains nuclei having magnetic moments, and preferably a very large gyromagnetic ratio. Hydrogen is one of the best materials for this purpose and it occurs abundantly in water, which is thereby very satisfactory for use in this invention. The water 13 may be modified so as to produce an intensified output by adding a paramagnetic salt in solution in order to reduce the relaxation time, as is understood in the art. Examples of these salts are ferrous and manganous sulfate.

Tubing 12 at one point flares into a bulbous portion comprising the polarizing chamber 16 preferably rectangular in cross-section as best shown in FIG. 2, for best occupying the space provided. Polarizing chamber 16 is large enough to provide adequate dwell time for the hydrogen nuclei in the polarizing magnetic field, and terminates in a length of tubing 18 necked down considerably in order to provide flow fast enough to provide comparatively fast transfer of the nuclei to detection chamber 20 which must be placed far enough away from polarizing chamber 16 to avoid being subject to any significant effects of the polarizing field. Detection chamber 20 which is subject to the precession field is made sufficiently large to provide adequate dwell of the water 13 therein equal to the relaxation time of the nuclei, approximately two seconds for water, and terminates in the feedwater tubing for pump 14.

The polarizing field for chamber 16 is provided by a permanent magnet 22 designed so that its poles terminate adjacent opposite sides of chamber 16 and wide enough to subject substantially the whole chamber 16 to the field between the poles, for maximum effect. The uniformity of the polarizing field permeating chamber 16 is not critical and hence a simple magnet of the type illustrated is adequate for the purposes of this invention. When the intensity of the precession or ambient magnetic field is of the order of magnitude of the polarizing field, or when the former field is comparatively weak when compared to the latter as would be the case when measuring the earth's magnetic field and it is not possible or practical to isolate detection chamber 20 from the influence of the polarizing (permanent magnet) field, a magnetic shield to enclose chamber 16 may be provided. For this purpose, a pair of coaxial cylindrical shield cans 24 and 26 separated, and the latter supported, by foam rubber 29, and extensions 28 and 30 fully enclose polarizing chamber 16, permanent magnet 22, and adjacent tubing including the necked-down portion 18. Magnet 22 is supported by a plurality of struts 31 of non-magnetic material such as wood or plastic. Water 13 passes from the polarizing field to the precession field to be measured rather quickly, and well within the relaxation period for the liquid 13 being used. The usual magnetic shielding material, such as Permalloy or soft iron, is chosen for constructing the magnetic shield cans 24 and 26, and extensions 28 and 30.

Surrounding detection chamber 20 or otherwise appropriately placed for picking up the voltages induced by the precessing hydrogen nuclei in the process of reorientation in the field to be measured is a coil $I_1$. A variable condenser $C_1$ may be placed across coil $I_1$ for tuning the combination to resonance at the precession frequency for obtaining better results. As best shown in FIG. 3, the output of this tuned circuit may be fed into an amplifier 32 and subsequently a frequency measuring circuit 34 which may include the usual recording apparatus, as understood in the art. For tickling the resonant circuit $C_1$, $I_1$, at the outset, an oscillator 33 of conventional design operating at the approximate, expected precession frequency may be connected through a small capacitor $C_2$ and a switch S-1 to one end of coil $I_1$. Switch S-1 would be temporarily closed during starting for the purpose only of stimulating the nuclei to precess coherently. Once in operation, magnetometer 10 will continuously provide a signal at a frequency equal to the precession frequency, which is proportional to or otherwise directly related of the intensity of the field undergoing measurement. Capacitor $C_1$ is initially adjusted for resonance, and would normally not require further adjustment unless the precession field changes considerably. Of course, automatic means, not illustrated, may be provided for continuously readjusting $C_1$ for resonance, or the latter may be dispensed with entirely, depending on circumstances and intended use of magnetometer 10.

The operation of magnetometer 10 shown in FIGS. 1 and 2 is as follows: Magnetometer 10 or just detection chamber 20 is immersed in the ambient or precession field. Pump 14 maintains the circulation of water 13 continuously throughout tube 12 in the direction of the arrow while the polarizing field in chamber 16 produced by permanent magnet 22 orients or points the magnetic moments of the hydrogen nuclei in the water into alignment with the polarizing field as is understood in the art. Water 13 then passes quickly from chamber 16 through tubing 18 into detection chamber 20 where the hydrogen nuclei are subject to the precession field. Coil $I_1$ adjacent chamber 20 picks up a voltage at the precession frequency due to the precessing of the magnetic fields of the nuclei returning to orientation with the ambient field. The signal voltage in coil $I_1$ is amplified and recorded as hereinbefore described.

It will be evident, as already noted, from the description of magnetometer 10 and its operation that the flow of water 13 must be controlled in such a way that the nuclei dwell in the polarizing field for a time of the order of magnitude of the relaxation time of the nuclei, which is about two seconds for protons in water, for the purpose of insuring complete orientation. Also, the nuclei once polarized must be transferred to detection chamber 20 during a time interval which is small compared to the relaxation time, so that most of the relaxation time will be available for measurement. Then, the nuclei must remain in detection chamber 20 for a time interval of the order of magnitude of the relaxation time in order to permit their giving up a considerable portion of the energy to $I_1$; and permanent magnet 22 must be sufficiently distant from the coil $I_1$ so as not to disturb the homogeneity of the field within chamber 20 nor cause any time dependent variation therein. That is, for the device to give field measurements which are independent of the orientation of the instrument, the field intensity at coil $I_1$ due to permanent magnet 22 must be less than the smallest variations in the intensity of the field to be measured. With these design considerations in mind, the relative sizes of the tubing and various chambers, and proper rate of fluid flow, can easily be calculated.

It is seen that the method and apparatus described above will accomplish the result of producing a continuous reading of the precession frequency for determining the intensity of a magnetic field, such as the earth's magnetic field, permitting frequency measurements to be taken over as long a period as is required, thereby resulting in higher precision than heretofore possible. Furthermore, since no pulsing takes place, there are no spurious transients to interfere with the results, and because the invention involves the use of a permanent magnet the electrical power requirements are reduced substantially, although, of course, a D.C. electromagnet may be used in particular circumstances. In application of the invention, it is not necessary to maintain a particular angular relationship between the polarizing field and the field to be measured, although, to obtain a reading at any particular instant, some angle, usually substantially greater than zero for desirable signal to noise ratio is required. Where the magnetometer is being moved in the precession field and thus the relative orientation is being continuously changed, proper design will insure that periodic passage of this angle through or near zero will not prevent substantially continuous readings.

It should be understood of course that the foregoing disclosure relates to only a preferred embodiment of the invention and that numerous modifications or alterations thereof may be made therein without departing from the spirit and scope of the invention as set forth in the appended claims. For example, in cases where the precession field is weak when compared to the polarizing field, it is not necessary to shield polarizing chamber 16. Instead, if necessary, a shield between chambers 16 and 20 may be resorted to. Further, this invention may be applied without the use of a closed cycle system provided there is an ample supply of a suitable fluid. It also may be feasible to use a gas or solid material, the latter, for example, being moved physically over the wheels of a pulley, or under particular circumstances it may be desirable to rotate or oscillate the polarizing field rather than the sensitive material.

What is claimed is:

1. Apparatus for continuously producing nuclear gyromagnetic moment free precession, comprising: gyromagnetic atom portions, means for circulating said atom portions in a continuous path within said apparatus, a first segment of said path adapted to be subjected therethrough to a first unidirectional magnetic field whereby said atom portions therein are predominantly oriented in a first direction, means fixedly disposed adjacent a second segment of said path for producing therethrough a second magnetic field angularly displaced from the first field whereby said atom portions therein are predominantly oriented in a second direction, means for slowing the circulation rate of said atom portions through said second segment, and means for mutually excluding the first and second fields in the segments whereby said atom portions circulating through the second segment into the first segment precess freely from the second direction to the first direction.

2. Apparatus for continuously producing nuclear gyromagnetic moment free precession, comprising: a continuous conduit filled with a fluid containing gyromagnetic nuclei, pump means for circulating said fluid in said conduit, a first segment of said conduit adapted to be subjected therethrough to a first unidirectional magnetic field whereby said nuclei therein are predominantly pointed in a first direction, a permanent magnet fixedly disposed about a second segment of said conduit for producing therethrough a second unidirectional magnetic field angularly displaced from the first field whereby said nuclei therein are predominantly pointed in a second direction, means for slowing the circulation rate of said fluid through said second segment, and a shield enclosing said magnet for mutually excluding the first and second fields in the segments whereby said nuclei circulating through the second segment into the first segment precess freely from the second direction to the first direction.

3. Apparatus as set forth in claim 2 further comprising means for decreasing the velocity of said circulating fluid at the segments and for increasing the velocity of said circulating fluid in the direction of said first segment from said second segment.

4. Apparatus for continuously detecting nuclear gyromagnetic moment free precession, comprising: gyromagnetic atom portions, means for circulating said atom portions in a continuous path, a first segment of said path adapted to be subjected therethrough to a first unidirectional magnetic field whereby said atom portions therein are predominantly oriented in a first direction, means fixedly disposed adjacent a second segment of said path for producing therethrough a second unidirectional magnetic field angularly displaced from the first field whereby said atom portions therein are predominantly oriented in a second direction, means for mutually excluding the first and second fields in the segments, and detector means fixedly disposed adjacent the first segment for discerning free precession as said atom portions circulating through the second segment into the first segment change orientation from the second direction to the first direction.

5. Apparatus for continuously detecting nuclear gyromagnetic moment free precession, comprising: a continuous conduit filled with a fluid containing gyromagnetic nuclei, pump means for circulating said fluid in said conduit, a first segment of said conduit adapted to be subjected therethrough to a first unidirectional magnetic field whereby said nuclei therein are predominantly pointed in a first direction, a permanent magnet fixedly disposed about a second segment of said path for producing therethrough a second unidirectional magnetic field angularly displaced from the first field whereby said nuclei therein are predominantly pointed in a second direction, a shield enclosing said magnet for mutually excluding the first and second fields in the segments, and a detector coil fixedly disposed about the first segment for discerning free precession as said nuclei circulating through the second segment into the first segment change orientation from the second direction to the first direction.

6. Apparatus as set forth in claim 5 further comprising means for decreasing the velocity of said circulating fluid at the segments, and for increasing the velocity of said circulating fluid in the direction of said first segment from said second segment.

7. Apparatus for continuously detecting nuclear gyromagnetic moment free precession, comprising: means for circulating the atom portions in a continuous path, a first segment of said path adapted to be subjected therethrough to a first unidirectional magnetic field whereby the atom portions therein are predominantly oriented in a first direction, means fixedly disposed adjacent a second segment of said path for producing therethrough a second unidirectional magnetic field angularly displaced from the first field whereby the atom portions therein are predominantly oriented in a second direction, means for mutually excluding the first and second fields in the segments, and means fixedly disposed adjacent the first segment for detecting the voltages induced as said atom portions, circulating through the second segment into the first segment precess freely from the second direction to the first direction.

8. Apparatus for continuously detecting nuclear gyromagnetic moment free precession, comprising: a continuous conduit filled with fluid containing the nuclei, pump means for circulating said fluid in said conduit, a first segment of said conduit adapted to be subjected therethrough to a first unidirectional magnetic field whereby the nuclei therein are predominantly pointed in a first direction, a permanent magnet fixedly disposed about a second segment of said conduit for producing a second unidirectional magnetic field angularly displaced from the first field whereby the nuclei therein are predominantly pointed in a second direction, a shield enclosing said magnet for mutually excluding the first and second fields in the segments, and a detector coil fixedly disposed about the first segment for detecting the voltages induced within said first segment as said nuclei circulating through the second segment into the first segment precess freely from the second direction to the first direction.

9. Apparatus as set forth in claim 8 further comprising means for decreasing the velocity of said circulating fluid at the segments, and for increasing the velocity of said circulating fluid in the direction of said first segment from said second segment.

10. Apparatus for continuously measuring a magnetic field, comprising: atom portions of known gyromagnetic properties, means for circulating said atom portions in a continuous path, a first segment of said path adapted to be subjected therethrough to a first unidirectional magnetic field whereby said atom portions therein are predominantly oriented in a first direction, means fixedly disposed adjacent a second segment of said path for producing therethrough a second undirectional magnetic field angularly displaced from the first field whereby said atom portions therein are predominantly oriented in a second direction, means for mutually excluding the first and second fields in the segments, and detector means fixedly disposed adjacent the first segment for producing a signal indicative of the strength of the first field as said nuclei circulating through the second segment into the first segment precess freely from the second direction to the first direction.

11. Apparatus for continuously measuring a magnetic field, comprising: a continuous conduit filled with a fluid containing nuclei of known gyromagnetic properties, pump means for circulating said fluid in said conduit, a first segment of said conduit adapted to be subjected therethrough to a first unidirectional magnetic field whereby said nuclei therein are predominantly pointed in a first direction, a permanent magnet fixedly disposed about a second segment of said path for producing therethrough a second unidirectional magnetic field angularly displaced from the first field whereby said nuclei therein are predominantly pointed in a second direction, a shield enclosing said magnet for mutually excluding the first and second fields in the segments, and a detector coil fixedly disposed about the first segment for producing a signal indicative of the strength of the first field as said nuclei circulating through the second segment into the first segment precess freely from the second direction to the first direction.

12. Apparatus as set forth in claim 11 further comprising means for decreasing the velocity of said circulating fluid at the segments, and for increasing the velocity of said circulating fluid in the direction of said first segment from said second segment.

References Cited in the file of this patent

UNITED STATES PATENTS

| | | |
|---|---|---|
| Re. 23,769 | Carian | Jan. 12, 1954 |
| Re. 23,950 | Bloch et al. | Feb. 22, 1955 |
| 2,721,970 | Levinthal | Oct. 25, 1955 |
| 2,728,217 | Richardson | Dec. 27, 1955 |

FOREIGN PATENTS

| | | |
|---|---|---|
| 746,114 | Great Britain | Mar. 7, 1956 |

OTHER REFERENCES

Hunter: Oil and Gas Journal, vol. 54, No. 66, Aug. 6, 1956, pp. 144 and 145.

Sherman: Physical Review, vol. 93, No. 6, Mar. 15, 1954, pages 1429 and 1430.

Suryan: Proceedings of the Indian Academy of Sciences, vol. 33, January–June 1951 (pp. 107–111).

Hopkins: The Review of Scientific Instruments, vol. 20, No. 6, June 1949, pp. 401 and 402.